April 7, 1959  R. W. SPENCER  2,881,059
CHEMICAL TAPER MILLING PROCESS
Filed March 2, 1956  2 Sheets-Sheet 1

*INVENTOR.*
RUSSELL W. SPENCER
BY *William R Lane*
ATTORNEY

April 7, 1959

R. W. SPENCER 2,881,059

CHEMICAL TAPER MILLING PROCESS

Filed March 2, 1956

INVENTOR.
RUSSELL W. SPENCER

BY

*William R Lane*

ATTORNEY

United States Patent Office 2,881,059
Patented Apr. 7, 1959

2,881,059

CHEMICAL TAPER MILLING PROCESS

Russell W. Spencer, Whittier, Calif., assignor to North American Aviation, Inc.

Application March 2, 1956, Serial No. 569,105

9 Claims. (Cl. 41—42)

This invention relates to a process for chemical taper milling. More particularly, this invention relates to a process for chemical taper milling in which a constant amount of metal is removed from the surface of a workpiece along straight-line planes generating from a common point.

Conventional tapered surfaces on metal specimens have been obtained in the past by slowly lowering and raising the specimen into and out of an etching solution. This has been a convenient method for obtaining conventional tapered surfaces on pieces of metal of conventional designs such as workpieces in the form of rectangular sheets. Such a procedure, which provides a varying exposure by raising and lowering the workpiece, results in the removal of a constant thickness of metal along straight-line horizontal parallel planes. In the manufacture of structural aircraft parts, it is often necessary to remove different amounts of metal from different sections of a workpiece or part, producing more or less complicated or nonuniform tapered surfaces on the workpiece. Hence, it is necessary to provide a process for accomplishing nonuniform chemical tapering of metal workpieces.

It is therefore an object of this invention to provide a novel chemical milling process.

It is likewise an object of this invention to provide a process for removing constant thicknesses of metal from a workpiece along straight-line planes that generate from a common point.

Another object of this invention is to provide a process which, in addition to removing a constant thickness of metal along straight-line planes generating from a common point, will in addition remove varying thicknesses of metal along a vertical plane.

Another object is to provide metal parts having a novel contour surface.

It is also an object of this invention to provide metal parts having points of common thickness located on straight-line planes which generate from a common point.

The above and other objects of this invention are accomplished by providing a process for taper milling a workpiece comprising immersing and emersing a point A of said workpiece in and out of an etching solution at a predetermined rate $R_1$ and concurrently immersing and emersing another point B of said workpiece in and out of said etching solution at a predetermined rate $R_2$, different from rate $R_1$. Carrying out the process in this manner has the effect of immersing and emersing the workpiece in an etching solution at a preselected rate and concurrently subjecting the workpiece to a rocking motion so that a point on its surface describes an arc about a preselected axis of reference. The reference axis of rotation may be within the surface boundary of the workpiece or it may be externally located.

The above and other objects of this invention are more readily explained with the aid of the accompanying drawings, in which Fig. 1 shows an etching tank containing an etching solution with a workpiece partially immersed therein, and the apparatus for raising and lowering the workpiece in and out of the etching solution;

Figure 7:
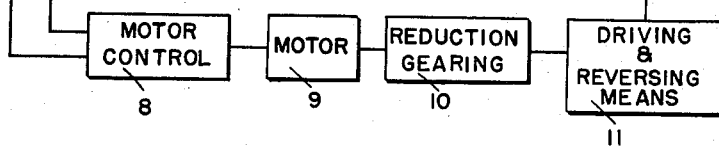
Fig. 7 shows a side view of a metal workpiece which was milled by the process of this invention from a piece of metal which was originally rectangular in shape and of uniform thickness.
Figure 7:
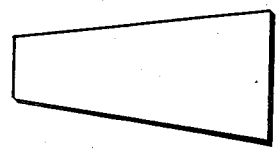
Figure 8:

And Fig. 8 is an end view of the workpiece shown in Fig. 7, showing the two convex surfaces meeting to form edges at the top and bottom.

Figure 1:
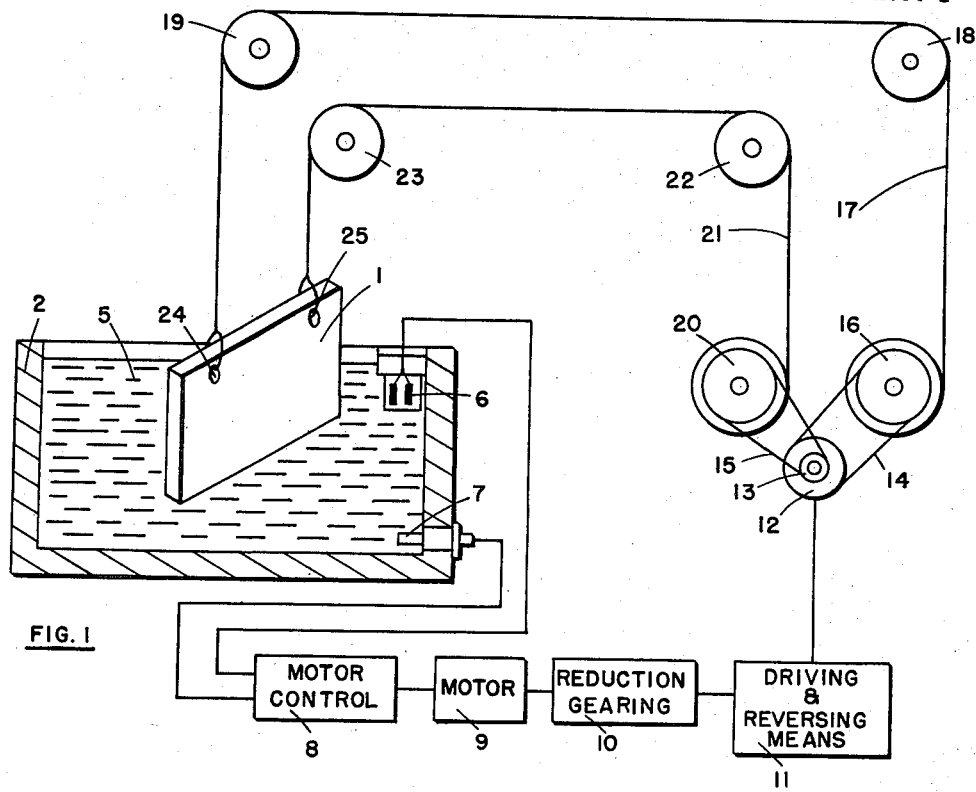

The principal of the invention is illustrated in Fig. 1 showing an etching tank 2 filled with an etching solution 5 in which a metal workpiece 1 is partially immersed. An etchant conductivity measuring means 6, and an etchant temperature measuring means 7, are connected to a motor control 8, which includes acceleration and deceleration control means as well as a speed regulating means. The motor control mechanism regulates the motor 9, which is connected through reduction gears 10, to driving and reversing gears 11. The driving gears operate coaxial drive pulleys 12 and 13. Drive pulley 12 operates a drive belt 14 which turns a drum pulley 16 at one speed, while drive pulley 13 operates a drive belt 15 which turns a drum pulley 20 at a rate slower than the one at which drum pulley 16 is turned. Drum pulley 16 operates the raising and lowering cable 17, which passes over sheaves 18 and 19 and has its other terminal connected to the workpiece 1 at point 24. In like manner, the drum pulley 20 is connected to a raising and lowering cable 21, which passes over sheaves 22 and 23 and has its terminal connected to the workpiece 1 at point 25. The motor control means 8 is adjusted to allow the motor to operate at a desired speed for a particular temperature range and concentration range of etchant solution. The temperature measuring means and the etchant conductivity measuring means regulate the speed of the motor in a manner which is described in U.S. Patent 2,724,918. However, the speed of the motor can be regulated by the conductivity measuring means alone, since the conductivity is a function of the concentration of the etching agent in solution and thus reflects the rate at which metal will be removed from the surface of a workpiece. The speed of rotation of the motor drive shaft is reduced by the reduction gears 10 so as to provide the desired rate of raising and lowering the workpiece in and out of the etching solution. The reversing gear mechanism is adjusted so as to provide for rotation of pulleys 12 and 13 first in one direction for a preselected number of revolutions followed by rotation in the opposite direction for the same number of revolutions. By this method, the workpiece is lowered and raised in and out of the etching solution. Because the coaxial drive pulleys 12 and 13 cause the drum pulleys 16 and 20 to rotate at different speeds, that part of the workpiece 1 which is represented by point 24, will be lowered and raised in and out of the solution at a faster rate than the part of the workpiece represented by point 25. Thus, a process for readily taper milling a workpiece is provided comprising immersing and emersing a point A (e.g., point 24) on a workpiece in and out of an etching solution at a predetermined rate, say $R_1$, and concurrently immersing and emersing another point B (e.g., point 25) on the workpiece in and out of an etching solution at a predetermined rate, say $R_2$, which is different from the rate $R_1$.

The reference points A and B, points 24 and 25 in the above illustration, have a lateral component of displacement from each other in a plane normal to the surface of the etching solution. For example, the points can be located in a plane which is parallel to the longitudinal axis of the workpiece. In the case of a workpiece originally consisting of a section of sheet material having substantially flat outer surfaces, the points may be any two points on one of the flat surfaces of the sheet. As in the above illustration, the reference points A and B may be conveniently selected so as to coincide with the points at which the workpiece is suspended, since the points of suspension will be raised and lowered at different rates. The points may also be located on opposite ends, or end sections, of a workpiece. For example,t the reference points A and B may be located on two opposite ends of a quadrilaterally shaped section of sheet metal, subjecting the workpiece to the action of the etchant in a manner such that one end of the workpiece is immersed and emersed in and out of the etching solution at a constant rate $R_1$ or a varying rate $R_1'$, while the other or opposite end is immersed and emersed at a constant rate $R_2$ different from $R_1$, or at a varying rate $R_2'$ different from $R_1'$.

Figure 2:
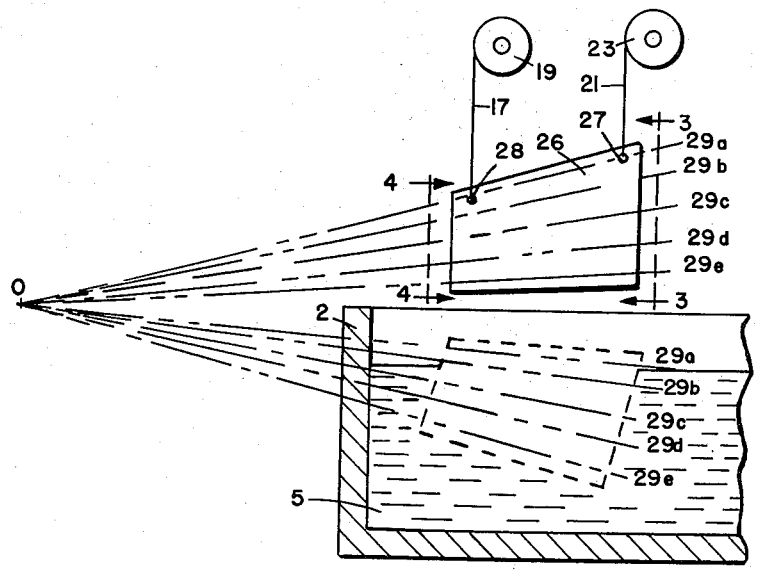
Fig. 2 shows a quadrilaterally shaped piece of metal and illustrates the manner in which it is raised and lowered in and out of an etching solution.

Fig. 2 more clearly illustrates the manner in which the process of this invention operates to produce a radially tapered surface on a workpiece originally having a flat surface. The end 4 of the workpiece 26, which is nearest the point of suspension 28, is immersed in and emersed from the etching solution at a faster rate than the end 3 of the workpiece which is nearest the point of suspension 27. This results in a constant thickness of metal being removed from the exposed face for the workpiece along straight-line planes indicated by lines $29(a)-(e)$, which radiate from a common point O. The common point O in this instance is located outside the specimen. The process of this invention causes a sheet of metal, originally of constant thickness, to become tapered by removing an increasingly greater amount of metal from the surface as the depth of the workpiece increases along a vertical plane.

Figure 3:
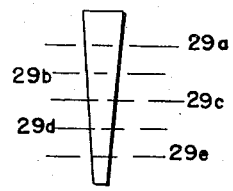
Fig. 3 shows one end section of the workpiece shown in Fig. 2.

Fig. 3 shows the tapered end 3 of the workpiece 26. The length of the end indicates the depth to which the piece was immersed in the etching solution along end 3. A flat plane taper is obtained when the workpiece was originally of uniform thickness and the workpiece is lowered and raised in and out of the solution at a constant rate.

Figure 4:
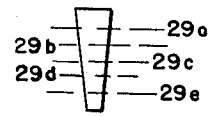
Fig. 4 shows a view of the other end of the workpiece shown in Fig. 2.

Fig. 4 gives a similar view of end 4 of the workpiece 26, and its length indicates the depth to which this end of the workpiece is immersed and emersed at a constant rate over the same time cycle that the opposite end, shown in Fig. 3, is immersed and emersed. The radial lines $29(a)-(e)$ indicate the constant thickness line planes of metal removed from the surface. Thus, when tapering sheets in this manner, radially tapered panels are obtained. This process of radial tapering is extremely important in the manufacture of aircraft frame parts.

When the axis of rotation is within the boundaries of the workpiece, the straight-line planes, along each of which a constant thickness of metal is removed, will pass through a common axis, represented by points on the surface on opposite sides of the workpiece. The straight-line planes referred to will radiate from these common points in the form of a fan.

An embodiment of the present invention is a process for taper milling a workpiece comprising immersing and emersing a point A on said workpiece in and out of an etching solution at a predetermined varying rate $R_1'$ and concurrently immersing and emersing another point B on said workpiece in and out of said etching solution at a predetermined varying rate $R_2'$, different from the rate $R_1'$. Carrying out the process in this manner has the effect of taper milling an originally flat surface to produce a concave tapered surface. In other words, in addition to removing a constant thickness of metal along straight-line planes generating from a common point, a varying thickness of metal is removed along a centrally located vertical plane.

Figure 5:
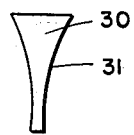
Fig. 5 shows an end view of a metal workpiece having a concave tapered surface.
Figure 6:
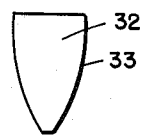
Fig. 6 shows an end of a workpiece having a convex tapered surface.

The results obtained when the rate of immersion and emersion are varied is illustrated in Figs. 5 and 6. Fig. 5, for example, illustrates an end view of the workpiece 26, shown in Fig. 2, which results when the rate of immersion is greater when the workpiece is first introduced into the etching solution, and is regularly decreased as the workpiece is lowered to a greater depth. Upon emersion, the rate is slower when the removal of the piece from the etching solution is started and regularly increases as the workpiece is further withdrawn from the solution. This procedure produces a concave etched surface on a workpiece which originally has flat surfaces. The procedure can be further illustrated with reference to Fig. 1. The variation in the rates of immersion and emersion is controlled by the acceleration and deceleration control means in the motor control means 8. The motor 9 can thus be controlled to decelerate as the workpiece 1 is being lowered into the etching solution and to accelerate when the workpiece is being withdrawn from the solution. Since the operation of the cables attached to the workpiece is controlled by the drive pulleys 12 and 13, which have different circumferences, the rate $R_1'$ at which point 24 is moved up and down will always be greater than the rate $R_2'$ at which point 25 is raised and lowered. The ratio of the rates $R_1':R_2'$ will have the same value as the ratio $C_1:C_2$ wherein $C_1$ represents the circumference of the pulley 12 and $C_2$ represents the circumference of pulley 13. This will hold true regardless of the acceleration and deceleration of the motor. In other words, the acceleration and deceleration is superimposed upon the raising and lowering technique described previously in which the points 24 and 25 of the workpiece were lowered at predetermined constant but different rates.

When $R_1'$ and $R_2'$ represent rates which are decreased as an originally flat workpiece of uniform thickness is lowered, and increased as it is raised in and out of the etching solution, a concave etched surface is obtained as shown in Fig. 5. A convex etched surface is obtained, however, when the acceleration and deceleration cycle is reversed so that the rates $R_1'$ and $R_2'$ are increased as the workpiece is lowered into the solution and decreased as it is raised out of the solution, as shown in Fig. 6. It is thus seen that the process of this invention can be employed, not only to produce flat radially tapered structures, but can also be used to produce radially tapered concave or convex surfaces.

The figures illustrate the process of this invention employing metal sheets originally having constant thickness. However, the process is equally applicable to chemically milling metal workpieces of any thickness, design or configuration. For example, the process is applicable to workpieces which are rectangular, cylindrical, spherical or have some other irregular surface.

When an even overall thickness of material is to be removed from the surface of the workpiece, it is immersed in the etching solution for a definite period of time sufficient to accomplish the required result. This procedure is combined with the immersing and emersing technique of the process of this invention when it is desired to not only taper the metal specimen but also to remove a predetermined thickness of metal from the entire surface.

The method by which the process is carried out is more fully illustrated in the examples that follow wherein the dimensions are given in inches and the rates are given in inches per minute:

*Example I*

The apparatus employed was similar to that shown in Fig. 1 which is described above. The etchant consisted of an aqueous solution of sodium hydroxide containing from 7 to about 9 weight percent of NaOH. The etch rate was determined by immersing a test strip of aluminum measuring 24" x 24" x 0.125" for a period of four minutes. Measuring the thickness of the strip before and after exposure to the etchant solution indicated that the solution removed metal from the surface at the rate of 1 mil per minute, 1 mil being 1/1000 of an inch. A sheet of aluminum measuring 32" x 48" x 0.081" was then attached to the raising and lowering cables as shown in Fig. 1. The points at which the cables were attached to the sheet of aluminum were about 2" in from the ends of the plate. The ratio of the circumference of pulley 12 to pulley 13 was 2.5 to 1. Accordingly, one end of the aluminum plate was lowered into the solution at a rate $R_1$ which was about 2½ times as fast as the rate $R_2$ at which the opposite end was lowered into the solution. The speed of the motor 9 was regulated by the motor control means 8 so that the end of the aluminum plate operated by the larger drive pulley 12 could be raised and lowered at the rate of about 6" per minute. The corresponding rate for raising and lowering the other end, operated by drive pulley 13, was about 2.4" per minute. The reversing mechanism was then adjusted to allow the plate, which was suspended just above the surface of the liquid etchant, to be lowered over a period of four minutes and then to be raised over a period of four minutes. Having adjusted the mechanism, the aluminum plate was dipped into the solution in two complete cycles of about four minutes immersion and about four minutes emersion. Thus, the lower edge of the plate, which was in contact with the etchant for the longest period of time, was exposed to the action of the etching solution for the total of substantially 16 minutes. This caused a thickness of 16 mils of metal to be removed from each side of the plate along the lower edge, or an overall thickness of 32 mils being removed from the plate. The whole aluminum plate was next immersed and allowed to remain in the etching solution for a period of eight minutes in order to remove a uniform thickness of 8 mils from the exposed surfaces, reducing the thickness by 16 mils. The plate was then withdrawn from the solution and washed with water. Upon checking the thickness of the etched plate, it was found that there were constant thickness straight-line planes radiating from a common point in the manner illustrated in Fig. 2. The common point was located on an extension of a line drawn along the bottom edge of the workpiece at a distance of 32.6" from that end of the plate which had been raised and lowered out of the etching solution at a slower rate. The plate had a uniform thickness along the lower edge of 0.0338±0.008. The plate also had a constant thickness along a diagonal line positioned above the bottom edge. This line ran from a point 24" above the bottom edge at the end which had been raised and lowered at the faster rate, to a point 9.6" above the lower edge at the end which had been raised and lowered at the slower rate. The thickness along this line was 0.0650±0.0002. Constant thickness radial straight-line planes passed through the specimen in an area bounded by the base and the diagonal line.

Similar results are obtained when the process of Example I is repeated with the modification that upon reaching maximum immersion, the workpiece is rapidly withdrawn from the solution. The cycle is repeated twice as many times to remove the same amount of metal from the surface. Reversing the procedure, that is, immersing to the maximum desired depth quickly and then withdrawing the workpiece at predetermined rates, as described in Example I, also give good results.

*Example II*

A sheet of aluminum is set up in the same manner as described in Example I. In this case, the motor control mechanism is adjusted to provide for an acceleration and deceleration cycle. One end of the aluminum plate is lowered into the solution at a rate which decreases from 7" per minute, at the instance of the lower edge touching the etching solution, to 5" per minute at maximum immersion. The maximum immersion along this end is 24" and is effected over a period of four minutes. The reversing mechanism then causes the motor to withdraw the plate at a progressively increasing rate varying from 5" per minute to 7" per minute, thus completing the cycle. The other end of the plate is concurrently raised and lowered at a rate which is only 0.4 times as great as that at which the opposite end is operated. The rate of immersion and emersion of the latter end varies, therefore, from 2.8" per minute maximum, to 2" per minute minimum. The aluminum plate is dipped a total of three times in this manner. The etched lower portion of the plate is bounded by an upper line which extends from a point 24" above the bottom edge of one end, to a point 9.6" above the bottom edge of the other end. The sides of the etched portion have concave surfaces on both sides of the plate so that an end view presents an appearance similar to that shown in Fig. 5. The etched portion has a constant thickness along the lower edge of 0.033 mil, while the thickness along the upper border of the etched portion is, of course, 0.081 mil, which represents the thickness of the metal plate prior to being exposed to the etching solution. The constant thickness radial straight-line planes pass through the etched portion of the plate. These constant thickness lines all radiate from a common point located on an extension of a line running along the bottom edge of the plate. The common point is found at a distance of 32" out from that end of the plate which is raised and lowered at the slower rate.

When the procedure of Example II is repeated with a specimen which is masked with a coating of vinyl type etchant resistant resin on one side, the concave radial tapering is achieved on the exposed surface only.

*Example III*

The procedure of Example II is repeated with a sheet of titanium and a titanium etching solution except that the acceleration and deceleration periods of the cycle are reversed. The titanium specimen measures 60" x 36" x 0.100". The etching solution is composed of 780 parts of water, 100 parts of chromic anhydride and 120 parts of hydrogen fluoride. The temperature of the solution is maintained at 150° F. during the etching by heating and regulating means. At this temperature it is found upon checking that the solution removes titanium from an exposed surface at the rate of 3 mils per minute. Drive pulleys 12 and 13 used in this procedure are such that one end of the sheet of titanium is lowered and raised at a rate which is four times as great as that at which the other end is operated. The motor control means and the reversing means are adjusted so that one end of the titanium sheet is lowered into the etching solution at a rate which increases from 4" at the instance at which the lower edge contacts the surface of the solution, to 10" per minute after a period of five minutes. At the end of this period of time, the immersion is to a depth of 35". At the same time the opposite end is immersed to a depth of 8.75" at rates which vary from 1" per minute to 2.5" per minute. The specimen is subjected to the action of the solution for one complete cycle only. A total of 60 mils (0.060") is removed from the two faces of the titanium sheet along the lower edge of the etched portion of the plate. The faces of the etched section have concave surfaces so that an end view of the section appears similar to that shown in Fig. 6, with a width at the lower end of 0.040" and a width along the upper boundary of the etched portion of 0.100".

When the procedure of Example III is modified so that the workpiece is immersed and emersed along an inclined plane rather than along a vertical plane, equally good results are obtained. The inclined plane immersion is facilitated by guide members in the etchant container along which the workpiece moves.

*Example IV*

The procedure of Example III is applied to a steel specimen, measuring 4" x 1.5" x 0.1". The etchant originally consists of 25 parts by volume of an 85 weight percent phosphoric acid, 20 parts by volume of 70 weight percent of nitric acid, 12 parts by volume of a 37 weight percent of hydrochloric acid and 43 parts by volume of water. The solution contains approximately 8 grams per liter of iron in the form of the various nitric, hydrochloric and phosphoric acid salts. The etching strength of the solution is such that it removes steel from the surface of a specimen at the rate of 2 mils per minute. The steel specimen is suspended in a manner similar to that shown in Fig. 1. The raising and lowering mechanism is so adjusted that one end of the specimen is raised and lowered at a rate which is twice the value that the other end is raised and lowered. The specimen is immersed to a depth equivalent to one-half of its width, namely 0.75", in the etching solution at a rate varying from 0.2" per minute, at the instance that the lower edge of one end of the specimen contacts the solution, to 0.25" per minute at maximum immersion. The other end of the specimen is immersed at rates varying from 0.08" per minute at initial immersion to 0.12" at maximum immersion. The suspension of the two ends of the specimen is adjusted so that, at maximum immersion, one-half of the specimen is in the etching solution. This requires that the end being raised and lowered at the slower rate initially contact the solution about four minutes before the other end touches the etchant. The cycle consists of about seven minutes lowering into the etching solution and seven minutes for the reverse operation. The complete cycle, consisting of about fourteen minutes, is repeated for a total of four times. Each cycle results in the etching away of approximately 12 mils from the surface along the lower edge which is subjected to contact with the etchant for the longest period of time. Thus, at the end of four cycles, a maximum of 0.05" is removed from the surface at the lower edge, with progressively less metal being removed as the line of maximum immersion is approached. The specimen is then turned over and the operation repeated subjecting the other one-half of the steel workpiece to the etching solution. The finished specimen has two convex surfaces which terminate in oppositely disposed tapered edges along the length of the workpiece. The length and the width of one end of the finished workpiece remains the same but the width of the other end is reduced by a factor of 2, to 0.75" due to the longer time of exposure which was governed by the slower rate of immersion and emersion. This is illustrated by the side view given in Fig. 7. The piece is 0.1" thick along its longitudinal axis. An end view of the steel specimen shown in Fig. 8, displays a plane surface bounded by convex sides which contact each other to form edges at the top and bottom. The finished workpieces of this type are employed as turbine vanes.

The examples given above illustrate the use of the process of this invention in chemically milling flat sheets of metal. However, conically-shaped specimens and workpieces having various other configurations and shapes are chemically milled in the same manner when it is desired to remove a constant thickness of metal along straight-line planes which radiate from a common point. For example, the process is applicable to chemically milling cylindrically-shaped solid metal and metal alloy workpieces from which it is desired to remove common thicknesses of metal along straight-line planes generating from a common axis. The process is also applicable to spherically-shaped workpieces and to workpieces having any irregular configuration.

The process is applicable to the chemical milling of any material, including various metals and alloys, by an appropriate etching solution. That is, the process is applicable to workpieces of iron, steel, nickel, cobalt, titanium, zinc, magnesium, molybdenum, the various other metals, alloys of different metals, and aluminum and its alloys.

The points of suspension are chosen to best suit the specimen at hand taking into consideration the surfaces from which the material is to be removed.

Metal is removed only from the surface which is exposed to the action of the etching solution. Parts of the surface which are to be immersed in the solution but which are not to be etched are protected with a suitable maskant which is resistant to the action of the etching solution. This maskant may be a vinyl type resin, a rubber composition, lead-backed tape, etc., depending on the metal or alloy to be etched and the composition of the etching solution. For example, a suitable maskant for aluminum is a polyvinyl type resin which is resistant to alkaline action.

The plane of motion of immersing and emersing a workpiece in and out of an etching solution may be normal to the surface of the solution, or the dipping motion can be along an inclined plane so that the workpiece enters the solution in a plane which makes an angle of less than 90° with the surface of the etchant. The latter procedure is used when long metal sheets or specimens are etched in shallow solution containers which are nevertheless of sufficiently large dimensions to accommodate the workpiece when inserted along an inclined plane. In this inclined plane dipping variation of the instant process, the workpiece is lowered into the solution along guide members positioned in the container. The guide members consist of strips of etchant resistant material fastened to the sides of the container. The workpiece is usually larger than the required finished product so that the edges which rest on the guide members can be trimmed off. Alternately the specimen may be transported into the etchant in a carriage along an inclined platform or track. The carriage consists of a framework of clamps pivotally mounted on a base structure supported on casters or rollers. The workpiece is clamped in place in the framework so that when lowered into the etchant, it can be in the plane which is parallel to the inclined plane of immersion. The guide members, platform and/or track are constructed of a substance inert to the action of the etchant or are coated with a suitable resist material. The dipping of the workpiece is accompanied with a rocking motion in the plane of immersion and emersion in the same manner as for vertical dipping so that two different points on the surface of the workpiece, having a component of displacement in the plane of motion, are inserted and withdrawn from the solution at different rates. Thus, radial tapering is obtained regardless of angle of dipping.

The ratio of the rates of lowering the different sections of the workpiece can vary over wide range and is governed only by the configuration of the etched surface which is desired. As indicated in the examples, the rates at which this specimen is raised or lowered in and out of the etching solution can also vary over a wide range and can be increased and decreased to a degree commensurate with the requirements of each project.

The design and complexity of the apparatus employed for raising and lowering the workpiece in and out of the etching solution is not restricted to the simple apparatus shown in Fig. 1. For example, the drive pulleys and drive belts can be replaced by an appropriate assembly of gears and drive shafts. An alternative method is to rigidly attach the workpiece to one end of an elongated member which is pivotally mounted at the other end on a stationary support. Raising and lowering the free end of the pivoted member so as to immerse and emerse the workpiece attached to it, will have the effect of raising and lowering one part or section of the workpiece at a faster rate than another part or section which is horizontally displaced from the first section and has a component of displacement in the plane of motion of the pivoted member.

Another method of carrying out the process of this invention is to rigidly suspend the workpiece from an elongated member which is pivotally supported at a point intermediate its ends from a suitable support stand. One end of the elongated member is contacted with a preshaped cam which, when rotated, causes the elongated member, and therefore the suspended workpiece, to execute a rocking motion. This will cause one end or point of the workpiece to be raised and lowered at one rate while the other end or point will be raised and lowered at another rate. The ratio of the two rates depend on the distance of the two ends or points from the point of suspension. When the workpiece is suspended just above the surface of the etching solution, this rocking motion is in some instances sufficient to immerse and emerse this specimen to the desired depth in the etchant. The rocking motion of the workpiece is sometimes also combined with a lowering and raising of the etching solution so as to get the desired depth of immersion. This raising and lowering of the solution is accomplished in a number of ways, one of which is raising and lowering the etchant container, while another is by pumping the solution in and out of the etchant container so as to raise and lower the level of the solution therein.

Although the invention has been described and illustrated in detail, with diagrams of proposed mechanisms by which the process can be carried out, it is to be clearly understood that the same is by way of illustration and example only and is not to be taken by way of limitation, the spirit and scope of this invention being limited only by the terms of the appended claims.

I claim:

1. A process for chemically taper milling a workpiece to give constant thicknesses along straight-line planes generating from a common point comprising immersing and then emersing a point A on said workpiece in and out of an etching solution a desired number of times at a rate $R_1$ and concurrently immersing and then emersing for said number of times another point B on said workpiece, laterally spaced from said point A, in and out of said etching solution at a rate $R_2$ which is different from the rate $R_1$.

2. A process of making a non-uniform tapered surface metal workpiece having variable thickness in different parallel planes, comprising providing two spaced reference points, A and B, on the surface of said workpiece, such that a line joining said points has a desired lateral component of displacement in a plane normal to the surface of an etching solution, repetitively immersing and then emersing said point A on said workpiece in and out of an etching solution at a rate $R_1$ and concurrently immersing and then emersing said other point B on said workpiece in and out of said etching solution at a rate $R_2$ which is different from the rate $R_1$.

3. A process of making a non-uniform tapered surface metal workpiece having a constant thickness along straight-line planes generating from a common point comprising repetitively immersing and then emersing one end of said workpiece in and out of an etching solution at a rate $R_1$ and concurrently immersing and then emersing the opposite end of said workpiece at a rate $R_2$ which is different from the rate $R_1$.

4. The process of claim 3 wherein the rates $R_1$ and $R_2$ are predetermined constant rates.

5. A process for chemically taper milling a workpiece having a constant thickness along straight-line planes generating from a common point comprising immersing and then emersing a point A on said workpiece in and out of an etching solution a desired number of times at a predetermined varying rate $R_1'$ and concurrently immersing and then emersing for said number of times another point B on said workpiece laterally spaced from said point A in and out of said etching solution at a predetermined varying rate $R_2'$ which is different from the rate $R_1'$.

6. The process of claim 5 wherein the varying rates $R_1'$ and $R_2'$ are progressively increased as the workpiece is immersed in the etching solution and progressively decreased as the workpiece is emersed from said etching solution.

7. The process of claim 5 wherein the varying rates $R_1'$ and $R_2'$ are progressively decreased as the workpiece is immersed in the etching solution and progressively increased as the workpiece is emersed from said etching solution.

8. The process for chemically taper milling an aluminum workpiece so as to remove constant thicknesses of metal along straight-line planes generating from a common point, comprising immersing and then emersing one end of said workpiece into an etching solution a desired number of times at a predetermined rate $R_1$ and concurrently immersing and then emersing for said number of times the opposite end into said etching solution at a predetermined rate $R_2$ which is different from the rate $R_1$.

9. The process of claim 8 wherein the rates $R_1$ and $R_2$ are predetermined constant rates.

References Cited in the file of this patent

UNITED STATES PATENTS

| | | |
|---|---|---|
| 2,157,845 | Bernarde | May 9, 1939 |
| 2,669,048 | Easley et al. | Feb. 16, 1954 |
| 2,724,918 | Triman | Nov. 29, 1955 |